(12) United States Patent  (10) Patent No.: US 8,635,851 B2
Vauchel et al.  (45) Date of Patent: Jan. 28, 2014

(54) GRID THRUST REVERSER COVER COMPRISING A SEAL SUPPORT AND ASSOCIATED SEAL

(75) Inventors: Guy Vauchel, Le Havre (FR); Eric Lecossais, Virville (FR); Frederic Zoonekyndt, Tournfeuille (FR)

(73) Assignee: Aircelle, Gonfreville l'Orcher (FR)

( * ) Notice: Subject to any disclaimer, the term of this patent is extended or adjusted under 35 U.S.C. 154(b) by 1071 days.

(21) Appl. No.: 12/594,829

(22) PCT Filed: Feb. 29, 2008

(86) PCT No.: PCT/FR2008/000284
§ 371 (c)(1),
(2), (4) Date: Oct. 6, 2009

(87) PCT Pub. No.: WO2008/142218
PCT Pub. Date: Nov. 27, 2008

(65) Prior Publication Data
US 2010/0044466 A1    Feb. 25, 2010

(30) Foreign Application Priority Data
Apr. 13, 2007 (FR) .......................... 07 2679

(51) Int. Cl.
*F02K 1/72* (2006.01)
(52) U.S. Cl.
USPC ................ 60/226.2; 244/110 B; 277/644
(58) Field of Classification Search
USPC ............... 60/226.2, 226.3, 230, 770, 771; 277/644, 645; 239/265.11, 265.29; 244/110 B
See application file for complete search history.

(56) References Cited

U.S. PATENT DOCUMENTS

| | | | |
|---|---|---|---|
| 4,015,818 A | | 4/1977 | Tawakol |
| 4,433,846 A | * | 2/1984 | Romero et al. ............... 277/551 |
| 4,468,043 A | * | 8/1984 | Brazel ........................... 277/651 |
| 4,508,355 A | | 4/1985 | Ditcher |
| 4,916,895 A | * | 4/1990 | Dubois ......................... 60/226.2 |
| 5,143,292 A | * | 9/1992 | Corsmeier et al. .......... 239/127.3 |
| 5,979,908 A | * | 11/1999 | Jones ............................ 277/604 |
| 6,151,883 A | * | 11/2000 | Hatrick et al. ............... 60/226.2 |
| 6,161,839 A | * | 12/2000 | Walton et al. ................. 277/590 |
| 6,663,042 B2 | * | 12/2003 | Hatrick et al. ............ 244/110 B |
| 7,004,477 B2 | * | 2/2006 | Sakata et al. .................. 277/612 |

FOREIGN PATENT DOCUMENTS

FR    2815672 A1    4/2002

OTHER PUBLICATIONS

International Search Report PCT/FR2008/000284; Dated Oct. 31, 2008.

* cited by examiner

*Primary Examiner* — William H Rodriguez
*Assistant Examiner* — Carlos A Rivera
(74) *Attorney, Agent, or Firm* — Brinks Gilson & Lione

(57) ABSTRACT

This grid thrust reverser cover comprises a seal support and a seal mounted in this support by means of two fastening lugs, this seal being capable of interacting with a diversion edge of this thrust reverser. At least one of the said lugs is turned up and the said support has a section matching that defined by the said lugs.

14 Claims, 4 Drawing Sheets

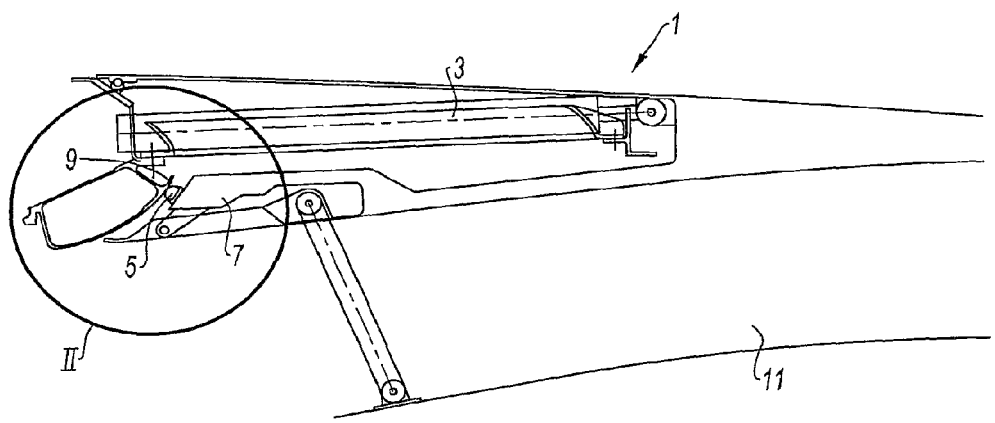
*Fig. 1*  Prior Art
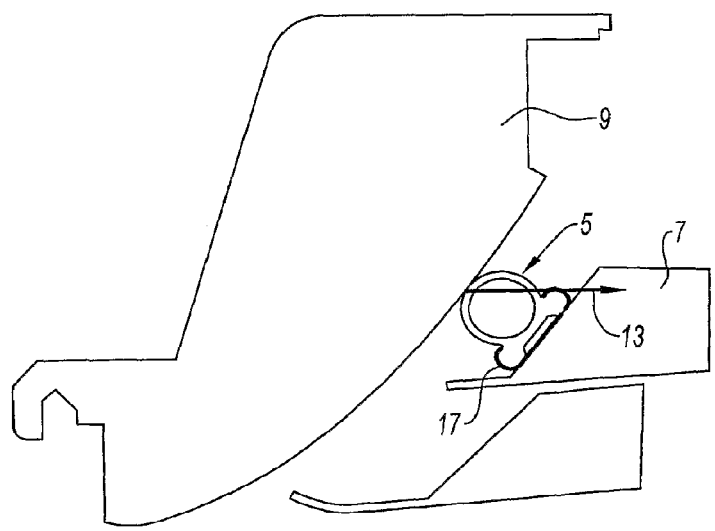
*Fig. 2*  Prior Art

GRID THRUST REVERSER COVER COMPRISING A SEAL SUPPORT AND ASSOCIATED SEAL

TECHNICAL FIELD OF INVENTION

The invention relates to a cascade thrust reverser cowl equipped with a deflection edge seal.

BRIEF DISCUSSION OF RELATED

In such a thrust reverser 1 having a grid-like cascade of vanes 3, which reverser is represented schematically in appended FIG. 1, there must be provided a seal 5 mounted on the cowl 7 and coming into contact with the deflection edge 9 when the reverser is in the closed position.

Specifically, in this position, air flowing through the cold air duct 11 under the effect of a fan (not shown) of a turbofan engine (not shown) must not be able to escape from this duct toward the cascade of vanes 3: the seal 5 provides this sealing.

Under the effect of the pressure exerted by the deflection edge 9, which pressure is symbolized by the arrow 13 in FIG. 2, the lower lug of this seal has a tendency to come out of the seal support 17 mounted on the cowl 7: the seal thus no longer performs its sealing function, and the performance losses are then considerable.

The work required to refit the seal 5 in its support 17 is costly and makes it necessary to immobilize the aircraft.

In an attempt to overcome this problem, the solution arrived at involves adhesively bonding the seal 5 to the bottom of its support 17: however, this is not satisfactory, firstly because, in spite of the presence of adhesive, the seal has a tendency to come out of its support, and secondly because the adhesive complicates the operations of replacing the seal in the case of wear.

BRIEF SUMMARY OF THE INVENTION

The invention provides a cascade thrust reverser cowl comprising a seal support and a seal mounted in this support by means of two fastening lugs, this seal being designed to cooperate with a deflection edge of this thrust reverser, said cowl being distinguished by the fact that at least one of said lugs is turned up, and by the fact that said support has a cross section matching that defined by said lugs.

According to other optional features of the reverser cowl according to the invention:

said two lugs are turned up: the presence of two such lugs allows an optimum retention of the seal;
said lugs extend toward the outside of this seal: this form is suitable for placing the seal on a C-shaped support (see below);
said lugs extend toward the inside of this seal: this form is suitable for placing the seal on a support in the form of a rail or tube (see below);
this seal has a symmetrical cross section: such a seal is adapted to absorb symmetrically distributed forces;
this seal has an asymmetrical cross section: such a seal is adapted to absorb asymmetrically distributed forces;
this seal comprises reinforcing means situated in said at least one lug: these reinforcing means allow a better holding of the seal in its support;
said reinforcing means comprise a wavy structure: such reinforcing means allow a longitudinal deformation of the seal that is appropriate when this seal is fastened to parts having skew surfaces;
said wavy structure is formed in a material chosen from the group comprising a plastic material, a metallic material, glass fibers and carbon fibers;
at least one of the lugs of said seal has notches allowing the insertion of a tool;
said support has a C-shaped cross section, the branch of this C that is intended to cooperate with said at least one turned-up lug being folded toward the inside of this C: this form is designed to cooperate with a seal whose lugs extend toward the outside;
the two branches of said C are folded toward the inside of this C: the presence of two such branches allows an optimum retention of the seal when this seal is intended to be subjected to forces coming from all directions;
the branches of said C have openings: these openings make it possible to check whether the lugs of the seal have been correctly placed in the support;
this support takes the form of a rail or tube: this support form is designed to cooperate with a seal whose lugs extend toward the inside of the seal.

BRIEF DESCRIPTION OF THE FIGURES

Other features and advantages of the invention will become apparent in light of the description below and from an examination of the appended figures, in which:

FIG. 1 is a schematic view of a cascade reverser provided with a seal of the prior art, this figure having been discussed in the preamble of the present description, FIG. 2 is a detail view of the region II in FIG. 1, this FIG. 2 having likewise been discussed in the preamble of the present description.

DETAILED DESCRIPTION OF THE INVENTION

Figure 3:
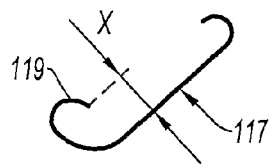
FIG. 3 is a view of the cross section of a seal support according to the present invention.

Reference will now be made to FIG. 3, in which it can be seen that, according to a first variant, a seal support 117 according to the invention can have a substantially C-shaped cross section, one 119 of the two branches of this support being folded toward the inside of the C, as is represented.

Figure 4:
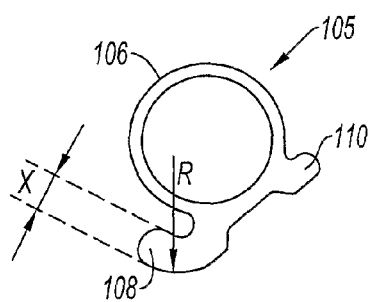
FIG. 4 is a view of the cross section of a seal designed to cooperate with the support in FIG. 3.

This support 117 is designed to accommodate the seal 105 represented in FIG. 4, which seal comprises a body 106 of substantially circular cross section, and two lugs 108, 110 extending toward the outside of the body 106, one 108 of these two lugs being turned up toward the body 106, as is represented in FIG. 4.

The thickness X of this lug is designed to correspond to the degree of opening X of the branch 119 of the support 117 (see FIG. 3).

Figure 5:
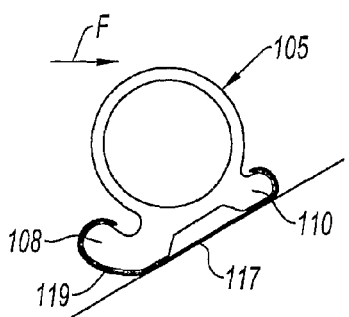
FIG. 5 is a view of this support and of this seal when they are assembled.
Figure 6:
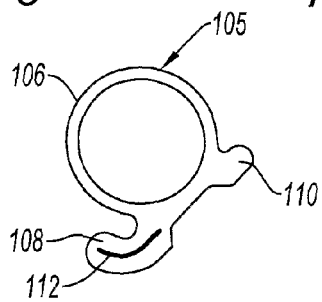
FIG. 6 is a view of a variant of this seal incorporating reinforcing means.

Furthermore, the radius R of the lug 108 is designed to allow the seal 105 to be fitted inside the support 117, as represented in FIG. 5.

What is meant by "turned up" within the context of the present invention is that the lug 108 is curved over on itself and that the branch 119 of the support 117 covers more or less the whole of this lug in such a way as to prevent this lug from disengaging from this branch under the action of forces oriented particularly in the direction of the arrow F shown in FIG. 5.

To enable the lug 108 to be held optimally inside the branch 119 of the support 117, provision can be made for the reinforcing means 112 to be embedded in the material forming the seal 105 (typically silicone).

Figure 7:
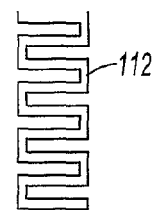
FIG. 7 is a plan view of the reinforcing means incorporated in the seal in FIG. 6, FIGS. 8 to 11 are schematic views indicating the sequence of operations for fitting the seal according to the invention in its support.
Figure 8:
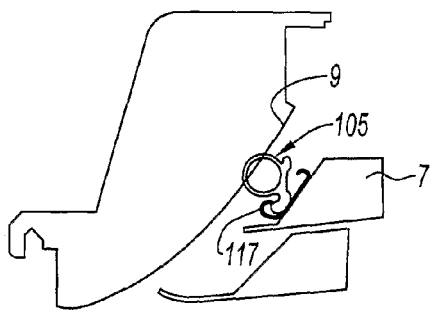
Figure 9:
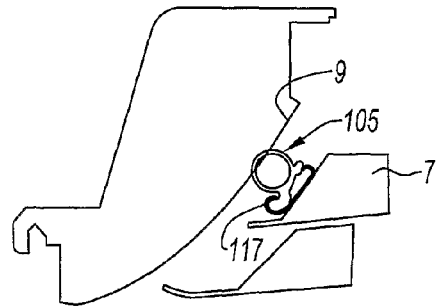
Figure 10:
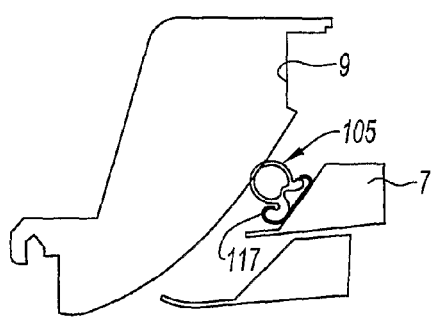

As represented in FIG. 7, these reinforcing means can typically comprise a member having a wavy shape that is formed in a plastic material, or else in a metallic material, or else in a glass fiber-based or carbon fiber-based material.

Figure 11:
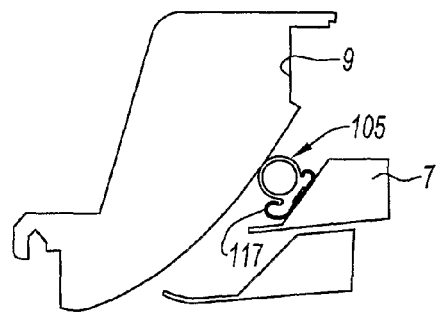

The sequence of operations for fitting the seal 105 inside the support 117 can be seen in FIGS. 8 to 11:
- the lug 108 is first introduced inside the branch 119 of the support 117 (FIGS. 8 and 9),
- the lug 110 is then compressed in the direction of the lug 108 so as to introduce this lug 110 into the other branch of the support 117 (FIG. 10),
- finally, the seal is relaxed such that the lug 110 of the seal 105 takes its place in the other branch of the support 117 (FIG. 11).

Figure 12:
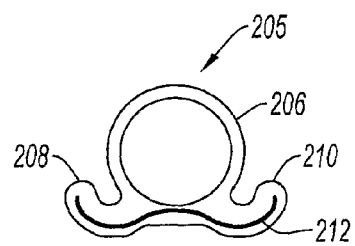
FIG. 12 represents a variant of the seal according to the invention.

In the variant represented in FIG. 12, the seal 205 according to the invention has a substantially symmetrical cross section, that is to say that the two lugs 208, 210 extend toward the outside of the body 206 of this seal and are turned up in the direction of this body.

Figure 13:
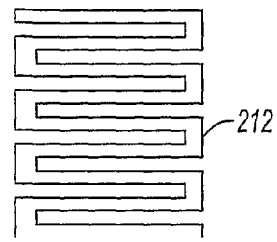
FIG. 13 represents reinforcing means incorporated in the seal in FIG. 12, FIGS. 14 to 17 indicate the sequence of operations for fitting this seal variant in its associated support.

As above, a reinforcing member 212 can be provided that has waves embedded in the material forming the two lugs 208, 210 of the seal 205 (see FIG. 13).

Figure 14:
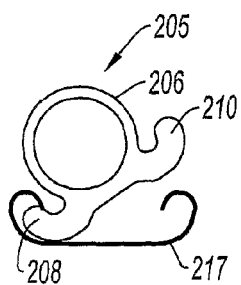
Figure 15:
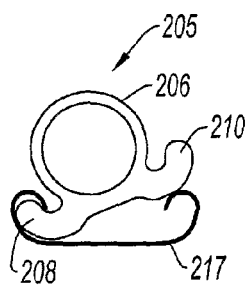
Figure 16:
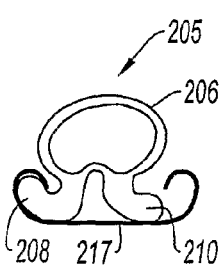
Figure 17:
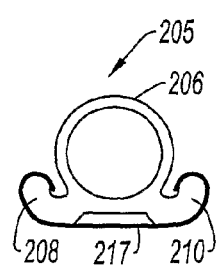

The sequence of operations for fitting this seal variant according to the invention is substantially analogous to the sequence for the seal mentioned above:
- one 208 of the two lugs is first positioned inside one of the branches of a support 217 of symmetrical cross section (FIGS. 14 and 15),
- the seal is then compressed so as to position the other lug 210 in the other branch of the symmetrical support 217 (FIG. 16), and
- the seal 205 is relaxed such that this other lug 210 is correctly lodged inside this other branch of the symmetrical support 217 (FIG. 17).

Figure 18:
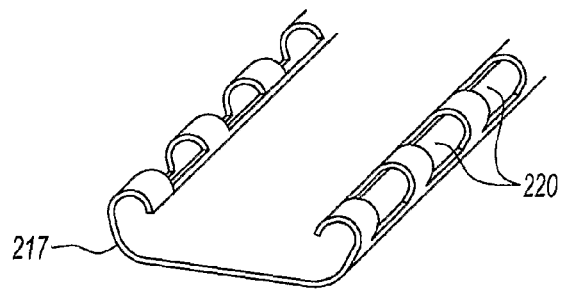
FIG. 18 represents, in perspective, a variant of a support for the seal in FIGS. 12 to 17.

As can be seen from FIG. 18, provision can be made for the support 217 to have openings in its two branches, thereby allowing a visual inspection of the correct positioning of the two lugs 208, 210 inside these branches.

Figure 19:
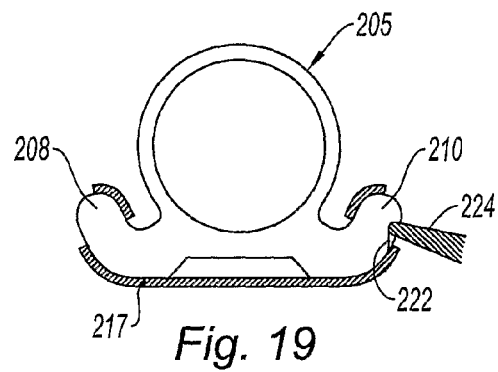
FIG. 19 is a view of the cross section of this seal when it is installed in the support in FIG. 18.

As represented in FIG. 19, provision can also be made for the lugs 208, 210 of the seal 205 to have notches 222 allowing the insertion of a tool 224 should these lugs not be correctly fitted in the branches of the support 217.

Figure 20:
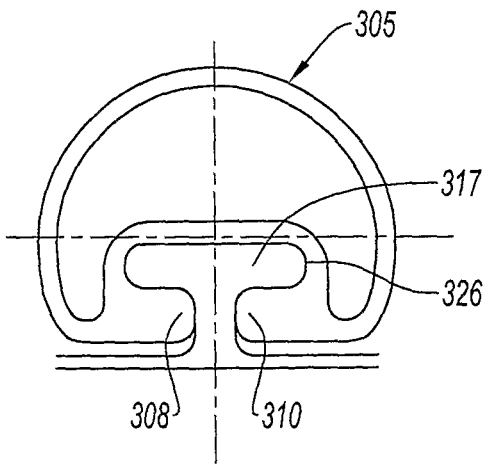
FIG. 20 represents another variant of the seal according to the invention installed in a suitable support.

In the variant represented in FIG. 20, the seal 305 has two lugs 308, 310 which are folded toward the inside of this seal and thus define a cavity 326 designed to encapsulate a support rail 317.

Figure 21:
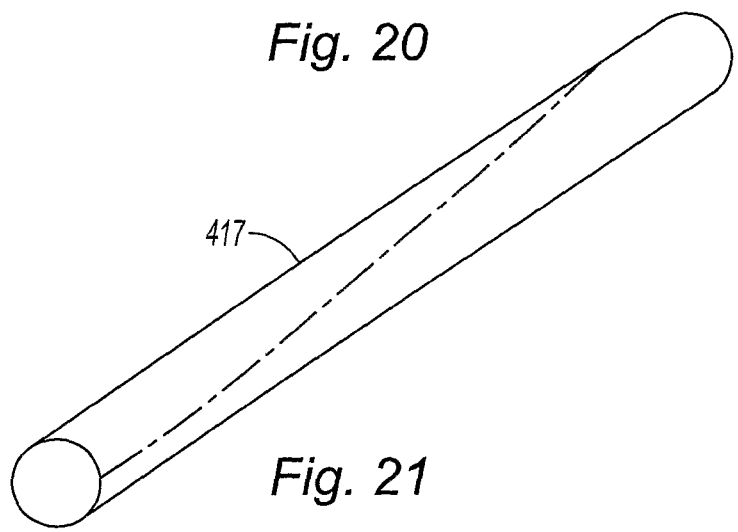
FIG. 21 represents another variant of a seal support.

In the variant represented in FIG. 21, the support rail 417 has a substantially circular cross section (tube), and the associated cavity 426 of the seal 405 has a corresponding circular cross section.

The mode of operation and the advantages of the seal and of its associated support that have just been described are immediately obvious from the foregoing description.

Figure 22:
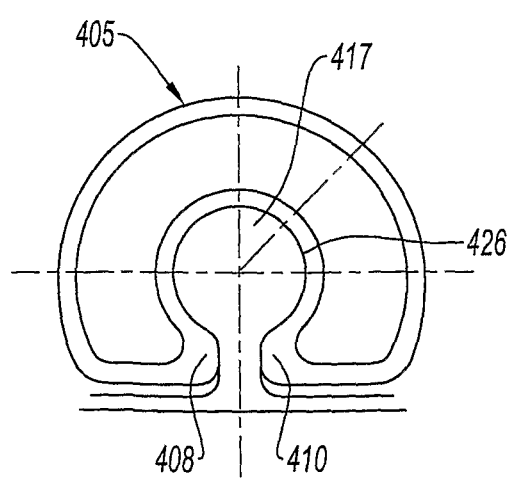
FIG. 22 represents the cross section of another variant of a seal designed to cooperate with the support in FIG. 21.

The turned-up lug or lugs of the seal (toward the outside: FIGS. 8 to 19, and toward the inside: FIGS. 20 to 22) allows or allow the seal to be anchored on its associated support.

This anchoring requires an elastic deformation of the seal and, when the seal returns to its original shape, it is retained in a very stable manner in/on its associated support.

The use of the reinforcing means 112, 212 makes it possible to ensure that the lugs of the seal are held optimally in the associated seal support while allowing a deformation of this seal in its longitudinal direction so as to enable it to hug the profile of the parts with which this seal is intended to cooperate.

By virtue of the excellent holding of the seal according to the invention in/on its support means, there is no longer any need to make provision to adhesively bond this seal, thus considerably facilitating the operations of replacing this seal in the case of wear.

The choice of the form of the seal and its associated support depends on the direction of the forces to which this seal is subjected.

In particular, it will be noted that the variant represented in FIGS. 3 to 11 is particularly suitable for a situation in which, as visible in FIG. 5, the seal is subjected to forces coming essentially from the direction F.

By contrast, the variants represented in FIGS. 12 to 22 are suitable more particularly for situations in which the seal can be stressed by forces coming from all directions.

Of course, the present invention is in no way limited to the example which has been described and represented, this example being provided purely by way of example.

The invention claimed is:

1. A cascade thrust reverser cowl comprising:
   a seal support; and
   a seal mounted in the support by two fastening lugs, the seal being designed to cooperate with a deflection edge of the thrust reverser,
   wherein at least one of said lugs is curved over on itself, and said support has a cross section matching that defined by said lugs so that the support covers the lug such that the lug is prevented from coming out of a branch of the support under an effect of pressure exerted by said deflection edge on said seal.

2. The cowl as claimed in claim 1, wherein said two lugs are curved over themselves.

3. The cowl as claimed in claim 1, wherein said lugs extend toward an outside of the seal.

4. The cowl as claimed in claim 1, wherein said lugs extend toward an inside of this seal.

5. The cowl as claimed in claim 1, wherein said seal has a symmetrical cross section.

6. The cowl as claimed in claim 1, wherein said seal has an asymmetrical cross section.

7. The cowl as claimed in claim 1, wherein said seal comprises reinforcing means situated in said at least one lug.

8. The cowl as claimed in claim 7, wherein said reinforcing means comprise a wavy structure.

9. The cowl as claimed in claim 8, wherein said wavy structure is formed in a material comprising at least one of a plastic material, a metallic material, glass fibers and carbon fibers.

10. The cowl as claimed in claim 1, wherein at least one of the lugs of said seal has notches allowing the insertion of a tool.

11. The cowl as claimed in claim 3, wherein said support has a C-shaped cross section comprising a branch intended to cooperate with said at least one turned-up lug being folded toward the inside of this C.

12. The cowl as claimed in claim 11, wherein the two branches of said C are folded toward the inside of the C.

13. The cowl as claimed in claim 11, wherein the branches of said C have openings.

14. The cowl as claimed in claim 4, wherein said support comprises a rail or tube.

* * * * *